(12) United States Patent
Madduluri et al.

(10) Patent No.: US 12,028,306 B2
(45) Date of Patent: Jul. 2, 2024

(54) GEO-LOCATED AND CONTENT-TO-COMMENT SYNCHRONIZED USER CIRCLES

(71) Applicant: SLING Media L.L.C., Foster City, CA (US)

(72) Inventors: Ramgopal Madduluri, San Carlos, CA (US); Maxim Litinov, Hayward, CA (US)

(73) Assignee: Sling Media L.L.C., Englewood, CO (US)

( * ) Notice: Subject to any disclaimer, the term of this patent is extended or adjusted under 35 U.S.C. 154(b) by 0 days.

(21) Appl. No.: 17/840,966

(22) Filed: Jun. 15, 2022

(65) Prior Publication Data

US 2022/0311725 A1  Sep. 29, 2022

Related U.S. Application Data

(62) Division of application No. 16/706,764, filed on Dec. 8, 2019, now Pat. No. 11,695,722.

(Continued)

(51) Int. Cl.
*G06F 16/27* (2019.01)
*G10L 15/22* (2006.01)
(Continued)

(52) U.S. Cl.
CPC ............ *H04L 51/222* (2022.05); *G06F 16/27* (2019.01); *G10L 15/22* (2013.01); *G10L 15/26* (2013.01);
(Continued)

(58) Field of Classification Search
CPC . H04L 51/222; H04L 65/1069; H04L 65/403; H04L 65/4015; H04L 67/52; G06F 16/27; G10L 15/22; G10L 15/26
See application file for complete search history.

(56) References Cited

U.S. PATENT DOCUMENTS 6,081,830 A   6/2000  Schindler
6,237,025 B1  5/2001  Ludwig et al.
(Continued)

FOREIGN PATENT DOCUMENTS

CN    103290360 B    3/2016
CN    110430457 A   11/2019
(Continued)

OTHER PUBLICATIONS

U.S. Appl. No. 17/336,416, Non-Final Office Action, dated Jul. 28, 2023.

(Continued)

*Primary Examiner* — Nicholas R Taylor
*Assistant Examiner* — Tania M Pena-Santana
(74) *Attorney, Agent, or Firm* — Wash Park IP Ltd.; John T. Kennedy

(57) ABSTRACT

Devices, systems and processes for providing geo-located and content-to-comment synchronized user circles are described. For at least one embodiment, a system for facilitating a geo-location based user circle may include a hub configured to facilitate a sharing of comments between a first user and a second user via a user circle. The first user and the second user may be selected for participation in the user circle based upon a circleID associated each of a first user device and a second user device. A first user device, communicatively coupled to the hub, may be configured to facilitate a capture of the comments provided by the first user. A second user device, communicatively coupled to the hub, may be configured to facilitate a presentation of the comments to the second user. And, a second device geoID may be used to indicate a location of the second user device.

17 Claims, 2 Drawing Sheets

Related U.S. Application Data

(60) Provisional application No. 62/880,580, filed on Jul. 30, 2019.

(51) Int. Cl.
   *G10L 15/26* (2006.01)
   *H04L 51/222* (2022.01)
   *H04L 65/1069* (2022.01)
   *H04L 65/403* (2022.01)

(52) U.S. Cl.
   CPC ........ *H04L 65/1069* (2013.01); *H04L 65/403* (2013.01)

(56) References Cited

U.S. PATENT DOCUMENTS

| | | |
|---|---|---|
| 6,256,663 B1 | 7/2001 | Davis |
| 6,392,664 B1 | 5/2002 | White et al. |
| 6,519,771 B1 | 2/2003 | Zenith |
| 6,643,291 B1 | 11/2003 | Yoshihara et al. |
| 6,646,673 B2 | 11/2003 | Caviedes et al. |
| 6,754,904 B1 | 6/2004 | Cooper et al. |
| 7,053,915 B1 | 5/2006 | Jung et al. |
| 7,143,428 B1 | 11/2006 | Bruck et al. |
| 8,015,306 B2 | 9/2011 | Bowman |
| 8,046,411 B2 | 10/2011 | Hayashi et al. |
| 8,223,185 B2 | 7/2012 | Gratton et al. |
| 8,316,400 B1 | 11/2012 | Kravets |
| 9,015,306 B2 | 4/2015 | Dupre et al. |
| 9,226,011 B2 | 12/2015 | Francisco |
| 9,252,950 B2 | 2/2016 | Caspi |
| 9,378,474 B1 | 6/2016 | Story, Jr. et al. |
| 9,471,809 B2 | 10/2016 | Garrett et al. |
| 9,544,624 B2 | 1/2017 | VanDuyn et al. |
| 9,654,817 B2 | 5/2017 | Li et al. |
| 10,135,887 B1 | 11/2018 | Esser et al. |
| 10,187,690 B1 | 1/2019 | Garcia et al. |
| 10,194,184 B2 | 1/2019 | Amento et al. |
| 10,237,587 B2 | 3/2019 | Zanabria et al. |
| 10,536,741 B1 | 1/2020 | Madison et al. |
| 10,575,042 B2 | 2/2020 | Rennison et al. |
| 10,735,825 B1 | 8/2020 | Comito et al. |
| 10,757,366 B1 | 8/2020 | Kwatra et al. |
| 10,757,467 B1 | 8/2020 | Katz et al. |
| 10,762,474 B2 | 9/2020 | Frank et al. |
| 10,819,758 B1 | 10/2020 | Krutsch et al. |
| 10,855,763 B2 | 12/2020 | Birrer et al. |
| 10,939,148 B2 | 3/2021 | Sun |
| 11,019,113 B2 | 5/2021 | Kurata et al. |
| 11,051,059 B2 | 6/2021 | Dodson et al. |
| 11,082,467 B1 | 8/2021 | Hartnett et al. |
| 11,128,916 B2 | 9/2021 | Mayhew et al. |
| 11,166,065 B1 | 11/2021 | Camargo et al. |
| 11,259,069 B1 | 2/2022 | Hsieh et al. |
| 11,303,947 B2 | 4/2022 | Bertolami et al. |
| 11,477,516 B2 | 10/2022 | Yoden |
| 11,502,864 B2 | 11/2022 | Moorefield et al. |
| 11,509,726 B2 | 11/2022 | Alsina et al. |
| 11,553,159 B1 | 1/2023 | Rothschild et al. |
| 11,588,869 B2 | 2/2023 | Gratton et al. |
| 11,606,597 B2 | 3/2023 | Iyer et al. |
| 11,695,722 B2 | 7/2023 | Madduluri et al. |
| 11,758,245 B2 | 9/2023 | Marten |
| 11,762,917 B2 | 9/2023 | Frank et al. |
| 2002/0067909 A1 | 6/2002 | Iivonen |
| 2003/0009766 A1 | 1/2003 | Marolda |
| 2003/0097655 A1 | 5/2003 | Novak |
| 2003/0229900 A1 | 12/2003 | Reisman |
| 2004/0154040 A1 | 8/2004 | Ellis |
| 2004/0205811 A1 | 10/2004 | Grandy et al. |
| 2005/0204387 A1 | 9/2005 | Knudson et al. |
| 2005/0262542 A1 | 11/2005 | DeWeese et al. |
| 2006/0101022 A1 | 5/2006 | Yu et al. |
| 2006/0149850 A1 | 7/2006 | Bowman |
| 2006/0161621 A1 | 7/2006 | Rosenberg |
| 2006/0174312 A1 | 8/2006 | Ducheneaut et al. |
| 2006/0236352 A1 | 10/2006 | Scott |
| 2006/0271960 A1 | 11/2006 | Jacoby et al. |
| 2007/0157281 A1 | 7/2007 | Ellis et al. |
| 2007/0229651 A1 | 10/2007 | Nakajima |
| 2007/0283380 A1 | 12/2007 | Aoki et al. |
| 2008/0037785 A1 | 2/2008 | Gantman et al. |
| 2008/0163285 A1 | 7/2008 | Tanaka et al. |
| 2009/0063983 A1 | 3/2009 | Amidon et al. |
| 2009/0089840 A1 | 4/2009 | Shusman |
| 2009/0167839 A1 | 7/2009 | Ottmar |
| 2009/0205008 A1 | 8/2009 | Wollmershauser et al. |
| 2009/0319885 A1 | 12/2009 | Amento et al. |
| 2009/0327428 A1 | 12/2009 | Ramanathan et al. |
| 2010/0066804 A1 | 3/2010 | Shoemake et al. |
| 2010/0281108 A1 | 11/2010 | Cohen |
| 2010/0306671 A1 | 12/2010 | Mattingly et al. |
| 2011/0016172 A1 | 1/2011 | Shah |
| 2011/0069940 A1 | 3/2011 | Shimy et al. |
| 2011/0154417 A1 | 6/2011 | Civanlar et al. |
| 2011/0219307 A1 | 9/2011 | Mate et al. |
| 2011/0246908 A1 | 10/2011 | Akram et al. |
| 2012/0131110 A1 | 5/2012 | Buyukkoc et al. |
| 2012/0151345 A1 | 6/2012 | McClements, IV |
| 2012/0216300 A1 | 8/2012 | Vivolo et al. |
| 2012/0218262 A1 | 8/2012 | Yomdin et al. |
| 2012/0246679 A1 | 9/2012 | Chen |
| 2012/0296972 A1 | 11/2012 | Backer |
| 2013/0016955 A1 | 1/2013 | Pejaver |
| 2013/0031192 A1 | 1/2013 | Caspi |
| 2013/0058632 A1* | 3/2013 | Jackson ............. H04N 21/4334 386/296 |
| 2013/0103814 A1 | 4/2013 | Carrasco et al. |
| 2013/0173765 A1 | 7/2013 | Korbecki |
| 2014/0068692 A1 | 3/2014 | Archibong et al. |
| 2014/0071344 A1 | 3/2014 | Francisco |
| 2014/0096167 A1 | 4/2014 | Lang et al. |
| 2014/0150002 A1 | 5/2014 | Hough et al. |
| 2014/0195675 A1 | 7/2014 | Silver |
| 2014/0205261 A1 | 7/2014 | Courtemanche |
| 2014/0269757 A1 | 9/2014 | Park et al. |
| 2014/0325557 A1 | 10/2014 | Evans et al. |
| 2015/0037777 A1 | 2/2015 | Kushner |
| 2015/0052571 A1 | 2/2015 | Stokking et al. |
| 2015/0106360 A1 | 4/2015 | Cao et al. |
| 2015/0172338 A1 | 6/2015 | Moran et al. |
| 2015/0215352 A1 | 7/2015 | Wong et al. |
| 2015/0230004 A1 | 8/2015 | VanDuyn et al. |
| 2015/0245106 A1 | 8/2015 | Tian |
| 2015/0327024 A1 | 11/2015 | Yang et al. |
| 2016/0006981 A1 | 1/2016 | Bauman et al. |
| 2016/0021153 A1* | 1/2016 | Hull ...................... G06F 16/337 715/753 |
| 2016/0044622 A1 | 2/2016 | Crowe et al. |
| 2016/0050160 A1 | 2/2016 | Li et al. |
| 2016/0182928 A1 | 6/2016 | Francisco |
| 2016/0241652 A1* | 8/2016 | Frazier ................... H04L 67/535 |
| 2016/0255041 A1 | 9/2016 | Lew et al. |
| 2016/0294894 A1 | 10/2016 | Miller |
| 2016/0366203 A1 | 12/2016 | Blong et al. |
| 2017/0006322 A1 | 1/2017 | Dury et al. |
| 2017/0093769 A1 | 3/2017 | Lind et al. |
| 2017/0103664 A1 | 4/2017 | Wong et al. |
| 2017/0264920 A1 | 9/2017 | Mickelsen |
| 2017/0312626 A1 | 11/2017 | Colenbrander |
| 2017/0346926 A1 | 11/2017 | Charters et al. |
| 2018/0035136 A1 | 2/2018 | Crowe |
| 2018/0167427 A1 | 6/2018 | Kedenburg, III |
| 2018/0192000 A1 | 7/2018 | Mercredi et al. |
| 2018/0288467 A1 | 10/2018 | Holmberg et al. |
| 2018/0316939 A1 | 11/2018 | Todd |
| 2018/0330756 A1 | 11/2018 | MacDonald |
| 2018/0365232 A1 | 12/2018 | Lewis et al. |
| 2019/0124159 A1 | 4/2019 | Alsina et al. |
| 2019/0147841 A1 | 5/2019 | Zatepyakin et al. |
| 2019/0155934 A1* | 5/2019 | Delaney ............. G06F 16/24575 |
| 2019/0179610 A1 | 6/2019 | Aiken et al. |
| 2019/0200054 A1 | 6/2019 | Dharmaji |
| 2019/0253742 A1 | 8/2019 | Garten et al. |

(56) References Cited

U.S. PATENT DOCUMENTS

| | | |
|---|---|---|
| 2019/0303874 A1 | 10/2019 | Yang et al. |
| 2019/0321720 A1 | 10/2019 | Nomura et al. |
| 2020/0029117 A1 | 1/2020 | Kalva et al. |
| 2020/0053312 A1 | 2/2020 | Mukherjee et al. |
| 2020/0112753 A1 | 4/2020 | Stockhammer et al. |
| 2020/0275149 A1 | 8/2020 | Su et al. |
| 2020/0402541 A1 | 12/2020 | Talbot et al. |
| 2021/0001236 A1 | 1/2021 | Srinivasan |
| 2021/0006864 A1 | 1/2021 | Xu et al. |
| 2021/0035559 A1 | 2/2021 | Xu |
| 2021/0037295 A1 | 2/2021 | Strickland |
| 2021/0051034 A1 | 2/2021 | Jonas et al. |
| 2021/0266621 A1 | 8/2021 | Marten |
| 2021/0321159 A1 | 10/2021 | Aggarwal et al. |
| 2022/0029825 A1 | 1/2022 | Uhr et al. |
| 2022/0040816 A1 | 2/2022 | Eckel et al. |
| 2022/0066621 A1 | 3/2022 | Appelbaum et al. |
| 2022/0070524 A1 | 3/2022 | Iyer et al. |
| 2022/0103873 A1 | 3/2022 | Yoshida et al. |
| 2022/0132214 A1 | 4/2022 | Felman |
| 2022/0141500 A1 | 5/2022 | Du |
| 2022/0166815 A1 | 5/2022 | Gratton et al. |
| 2022/0174357 A1 | 6/2022 | Zavesky et al. |
| 2022/0224659 A1 | 7/2022 | Ghazzal |
| 2022/0256231 A1 | 8/2022 | Eniwumide |
| 2022/0311725 A1 | 9/2022 | Madduluri et al. |
| 2022/0377413 A1 | 11/2022 | Lidaka et al. |
| 2022/0394328 A1 | 12/2022 | Marten |
| 2022/0408161 A1 | 12/2022 | Garten |
| 2023/0145338 A1 | 5/2023 | Iyer et al. |
| 2023/0147705 A1 | 5/2023 | Huertas et al. |
| 2023/0179822 A1 | 6/2023 | Marten et al. |
| 2023/0179823 A1 | 6/2023 | Marten et al. |
| 2023/0179825 A1 | 6/2023 | Drennan et al. |
| 2023/0214510 A1* | 7/2023 | Vijayakumar ........ H04L 51/043 726/27 |
| 2023/0214780 A1* | 7/2023 | Fong ..................... G06Q 10/103 705/7.18 |
| 2023/0247067 A1 | 8/2023 | Adams et al. |
| 2023/0362461 A1 | 11/2023 | Marten |
| 2024/0040178 A1 | 2/2024 | Marten |
| 2024/0064355 A1 | 2/2024 | Marten |
| 2024/0064356 A1 | 2/2024 | Marten |

FOREIGN PATENT DOCUMENTS

| | | |
|---|---|---|
| WO | PCTIB2021057835 | 8/2021 |
| WO | 2022049466 A1 | 3/2022 |

OTHER PUBLICATIONS

U.S. Appl. No. 17/543,852, RCE and Response to Non-Final Office Action, dated Aug. 22, 2023.
U.S. Appl. No. 17/543,886, RCE and Response to Final Office Action, dated Aug. 21, 2023.
U.S. Appl. No. 17/543,925, Notice of Allowance and Examiner Interview Summary, dated Jul. 27, 2023.
U.S. Appl. No. 18/094,369, Response to non-final Office Action with Terrminal Disclaimer, dated Aug. 22, 2023.
U.S. Appl. No. 18/363,897, Application as filed Aug. 2, 2023.
U.S. Appl. No. 16/801,277, Notice of Allowance & Interview Summary, dated Jul. 12, 2023.
U.S. Appl. No. 16/801,277, Supplemental Amendment & Interview Summary, dated Jun. 27, 2023.
U.S. Appl. No. 17/543,925, Final Office Action, dated Jul. 7, 2023.
U.S. Appl. No. 17/543,925, Response to Final Office Action and eTerminal Disclaimer, dated Jul. 8, 2023.
U.S. Appl. No. 18/222,453, Continuation application as filed, Jul. 16, 2023.
U.S. Appl. No. 15/788,058, Prosecution History through Jul. 19, 2022.
U.S. Appl. No. 17/336,416, Non-final Office Action, dated Jun. 16, 2021.
U.S. Appl. No. 17/376,459, RCE and Response to Final Office Action, dated Jul. 5, 2022.
U.S. Appl. No. 16/706,764, RCE, filed Jul. 19, 2022.
U.S. Appl. No. 17/543,852, Non-Final Office Action, dated Dec. 5, 2022.
U.S. Appl. No. 18/314,987, Non-Final Office Action, dated Sep. 13, 2023.
U.S. Appl. No. 18/484,241, Application filed, Oct. 10, 2023 (Available via Patent Center).
U.S. Appl. No. 16/706,764, Notice of Allowability, dated May 11, 2023.
U.S. Appl. No. 16/801,277, RCE and response to Final Office Action, dated Mar. 21, 2023.
U.S. Appl. No. 17/336,416, RCE and Response to Final Office Action, dated Apr. 4, 2023.
U.S. Appl. No. 17/376,459, Notice of Allowance, dated Apr. 24, 2023.
U.S. Appl. No. 17/376,459, Response to Final Office Action, dated Mar. 29, 2023.
U.S. Appl. No. 17/543,852, Response to Non-Final Office Action, dated Apr. 3, 2023.
U.S. Appl. No. 17/543,886, Response to Non-Final Office Action, dated Apr. 5, 2023.
U.S. Appl. No. 18/314,987, Application as filed May 10, 2023.
U.S. Appl. No. 17/087,815, Notice of Allowability, dated Sep. 9, 2022.
M. O. van Deventer, H. Stokking, M. Hammond, J. Le Feuvre and P. Cesar, "Standards for multi-stream and multi-device media synchronization," in IEEE Communications Magazine, vol. 54, No. 3, pp. 16-21, Mar. 2016, doi: 10.1109/MCOM.2016.7432166. (Year: 2016).
U.S. Appl. No. 18/094,369, Application as filed, Jan. 8, 2023.
U.S. Appl. No. 16/706,764, Prosecution Reopened, dated Jan. 4, 2023.
U.S. Appl. No. 16/801,277, Final Office Action, dated Dec. 23, 2022.
U.S. Appl. No. 17/336,416, Final Office Action, dated Jan. 9, 2022.
U.S. Appl. No. 17/543,886, Non-Final Office Action, dated Dec. 19, 2022.
U.S. Appl. No. 17/543,925, Non-final Office Action, dated Jan. 31, 2023.
U.S. Appl. No. 17/336,416, filed Jun. 2, 2021, Neil Marten.
U.S. Appl. No. 17/376,459, filed Jul. 15, 2021, Neil Marten.
U.S. Appl. No. 17/543,852, filed Dec. 7, 2021, Ross Alan Drennan.
U.S. Appl. No. 17/543,886, filed Dec. 7, 2021, Neil Marten.
U.S. Appl. No. 17/543,925, filed Dec. 7, 2021, Neil Marten.
U.S. Appl. No. 62/880,573, filed Jul. 30, 2019, Ramgopal Madduluri.
"Be anyone and reface anything"—downloaded from the Internet on Nov. 3, 2021 from https://hey.reface.ai/.
A. Colaco, I. Kim and C. Schmandt, "Back Talk: An auditory environment for sociable television viewing," 2011 IEEE Consumer Communications and Networking Conference (CCNC), 2011, pp. 352-356, doi: 10.1109/CCNC.2011.5766489. (Year: 2011).
ATSC Standard: ATSC 3.0 System, Doc. A/300:2019, Sep. 17, 2019.
DeepFace Lab for Windows, downloaded from the Internet on Nov. 3, 2021 from https://deepfacelab.en.softonic.com/.
Faceswap, downloaded from the Internet on Nov. 3, 2021 from https://faceswap.dev/.
Family Fun with Deepfakes . . . , downloaded from the Internet on Oct. 23, 2021, from https://towardsdatascience.com/family-fun-with-deepfakes-or-how-i-got-my-wife-onto-the-tonight-show-a4554775c011.
IN-202041037988.
PCT/IB2021/057835, Int'l Search Report and Written Opinion, dated Jan. 27, 2022.
PCT/IB2021/057835, Invitation to pay Additional Fees and Preliminary International Search Results.
U.S. Appl. No. 16/706,686, Application as filed, Dec. 7, 2019.
U.S. Appl. No. 16/706,686, Non-Final Office Action, dated May 12, 2021.

(56) References Cited

OTHER PUBLICATIONS

U.S. Appl. No. 16/706,686, Filed Dec. 7, 2019, prosecution history.
U.S. Appl. No. 16/706,764, Non-Final Office Action, dated Jun. 10, 2021.
U.S. Appl. No. 16/706,764, Application as filed, Dec. 8, 2019.
U.S. Appl. No. 16/706,764, Issue Fee Paid, dated Jun. 15, 2022.
U.S. Appl. No. 16/706,764, Non-Final Office Action Response, dated Sep. 7, 2021.
U.S. Appl. No. 16/706,764, Notice of Allowance, dated Mar. 17, 2022.
U.S. Appl. No. 16/801,277, Application as filed, Feb. 26, 2020.
U.S. Appl. No. 17/087,815, Application as filed, Nov. 3, 2020.
U.S. Appl. No. 17/087,815, Non-Final Office Action, dated Feb. 24, 2022.
U.S. Appl. No. 17/087,815, Response to Non-Final Office Action, dated May 23, 2022.
U.S. Appl. No. 17/336,416, Application as filed, Jun. 2, 2021.
U.S. Appl. No. 17/376,459, Application as filed, Jul. 15, 2021.
U.S. Appl. No. 17/376,459, Final Office Action, dated May 2, 2022.
U.S. Appl. No. 17/376,459, Non-Final Office Action, dated Dec. 17, 2021.
U.S. Appl. No. 17/376,459, Response to Non-final Office Action, dated Mar. 5, 2022.
U.S. Appl. No. 17/543,852, Application as filed, Dec. 7, 2021.
U.S. Appl. No. 17/543,886, Application as filed, Dec. 7, 2021.
U.S. Appl. No. 17/543,925, Application as filed, Dec. 7, 2021.
U.S. Appl. No. 62/880,580.
U.S. Appl. No. 17/543,852, Final Office Action, dated May 26, 2022.
U.S. Appl. No. 17/543,886, Final Office Action, dated May 25, 2023.
U.S. Appl. No. 17/543,925, Non-final Office Action Response, dated May 29, 2023.
U.S. Appl. No. 17/891,939, Examiner Interview Summary, dated Jun. 8, 2023.
U.S. Appl. No. 17/891,939, Amendment and Examiner Initiated Interview Summary, dated May 31, 2023.
U.S. Appl. No. 17/891,939, Notice of Allowance, dated Jun. 8, 2023.
U.S. Appl. No. 18/094,369, Non-Final Office Action, dated Jun. 8, 2023.
U.S. Appl. No. 17/543,852, Notice of Allowance, dated Sep. 8, 2023.
U.S. Appl. No. 17/543,886, non-final Office Action, dated Sep. 14, 2023.
U.S. Appl. No. 15/788,058, Request for Continued Examination, Amendment and IDS, dated Nov. 3, 2022.
U.S. Appl. No. 15/788,058, NTC Appeal with Pre-Appeal Brief Conference Request, dated Sep. 7, 2022.
U.S. Appl. No. 15/788,058, Notice of Allowance dated Nov. 30, 2022.
U.S. Appl. No. 16/706,764, Ntc Allowance, dated Sep. 8, 2022.
U.S. Appl. No. 16/801,277, Response to non-final Office Action, dated Nov. 28, 2022.
U.S. Appl. No. 17/336,416, Response to Non-final Office Action, dated Sep. 12, 2022.
U.S. Appl. No. 17/376,459, Final Office Action, dated Dec. 1, 2022.
U.S. Appl. No. 17/376,459, Response to Non-final Office Action, dated Oct. 11, 2022.
U.S. Appl. No. 18/094,369, Final Office Action, dated Nov. 29, 2023 (Available at Patent Center).
U.S. Appl. No. 18/314,987, Applicant Initiated Interview Summary, dated Nov. 17, 2023, (Available at Patent Center).
U.S. Appl. No. 17/336,416, Advisory Action, dated Jan. 29, 2024 (Available at USPTO Patent Center).
U.S. Appl. No. 17/336,416, RCE, dated Jan. 29, 2024 (Available at USPTO Patent Center).
U.S. Appl. No. 17/336,416, Non-Final Office Action, dated Feb. 22, 2024 (Available at USPTO Patent Center).
U.S. Appl. No. 17/543,886, Final Office Action, dated Feb. 15, 2024 (Available at USPTO Patent Center).
U.S. Appl. No. 18/094,369, Notice of Allowance, dated Feb. 14, 2024 (Available at USPTO Patent Center).
U.S. Appl. No. 18/094,369, Response to Final Office Action, dated Jan. 27, 2024 (Available at USPTO Patent Center).
U.S. Appl. No. 18/484,241, Notice of Publication, dated Feb. 2, 2024 (Available at USPTO Patent Center).
U.S. Appl. No. 16/706,764, filed Dec. 8, 2019.
U.S. Appl. No. 16/801,277, filed Feb. 26, 2020.
U.S. Appl. No. 17/087,815, filed Nov. 3, 2020.
U.S. Appl. No. 17/376,459, filed Jul. 15, 2021.
U.S. Appl. No. 17/336,416, filed Jun. 2, 2021.
U.S. Appl. No. 17/543,852, filed Dec. 7, 2021.
U.S. Appl. No. 17/543,886, filed Dec. 7, 2021.
U.S. Appl. No. 17/543,925, filed Dec. 7, 2021.
U.S. Appl. No. 15/788,058, filed Oct. 19, 2017.
U.S. Appl. No. 17/891,939, filed Aug. 19, 2022.
U.S. Appl. No. 16/706,686, filed Dec. 7, 2019.
U.S. Appl. No. 17/336,416, Non-Final Office Action Response, dated Oct. 23, 2023 (Available at USPTO Patent Center).
U.S. Appl. No. 18/222,453, Notice of Publication, dated Nov. 9, 2023 (Available at USPTO Patent Center).
U.S. Appl. No. 16/706,764, RCE, dated Jul. 19, 2022.
U.S. Appl. No. 17/336,416, Final Office Action, dated Dec. 22, 2023 (Available at USPTO Patent Center).
U.S. Appl. No. 17/336,416, Response to Final Office Action, dated Jan. 9, 2024 (Available at USPTO Patent Center).
U.S. Appl. No. 17/543,886, Response to non-final Office Action, dated Jan. 5, 2024 (Available at USPTO Patent Center).
U.S. Appl. No. 18/314,987, Response to Non-Final Ofice Action, dated Dec. 13, 2023, (Available at Patent Center).
U.S. Appl. No. 18/484,241, filed Oct. 10, 2023.
U.S. Appl. No. 18/094,369, filed Jan. 8, 2023.
U.S. Appl. No. 18/222,453, filed Jul. 16, 2023.
U.S. Appl. No. 18/363,897, filed Aug. 2, 2023.
U.S. Appl. No. 18/314,987, filed May 10, 2023.
U.S. Appl. No. 16/801,277, Non-Final Office Action, dated Aug. 30, 2022.
U.S. Appl. No. 17/087,815, Notice of Allowance, dated Sep. 1, 2022.
U.S. Appl. No. 17/376,459, Non-final Office Action, dated Jul. 29, 2022.
U.S. Appl. No. 17/891,939, Application Filed, Aug. 19, 2022.
U.S. Appl. No. 17/336,416, Response to Non-Final Office Action, May 3, 2024 (Available at USPTO Patent Center).
U.S. Appl. No. 18/484,241, Non-Final Office Action, May 20, 2024 (Available at USPTO Patent Center).
U.S. Appl. No. 18/657,624, Application as filed, May 7, 2024 (Available at USPTO Patent Center).

* cited by examiner

GEO-LOCATED AND CONTENT-TO-COMMENT SYNCHRONIZED USER CIRCLES

CROSS-REFERENCE TO RELATED APPLICATIONS

This application claims priority to and is a Divisional application of U.S. Utility application Ser. No. 16/706,764, filed on Dec. 8, 2019, and also claims priority to U.S. Provisional Application Ser. No. 62/880,580, filed on Jul. 30, 2019, both applications being filed in the name of inventors Ramgopal Madduluri and Maxim Litinov (who also goes by Maksym Litvinov) and entitled "Devices, Systems and Processes for Providing Geo-Located and Content-to-Comment Synchronized User Circles." The entire contents of both of the above identified applications are incorporated herein by reference.

TECHNICAL FIELD

The technology described herein generally relates to devices, systems and processes for providing virtual environments in which a group of two or more persons may engage with each other regarding audio-visual and other content. The technology described herein also relates to devices, systems and processes for providing virtual environments for engagement regarding audio-visual and other content by two or more persons organized into geo-located groups. The technology described herein also relates to devices, systems and processes for providing virtual environments for engagement regarding audio-visual and other content by two or more persons, where presentation of the content may be time-delayed with respect to one or more of such persons.

BACKGROUND

Today, users may commonly receive video content (such as television programs and streaming video programs), audio programs (such as podcasts), and the like. Such content, regardless of form, is referred to herein as a "program." User often are not able to interact in a group of two or more persons with regard to such a program. For example, a group of users watching a program on a given cable channel are not, today, capable of interacting with each other regarding the content of such program using a single interface or system. Such content is referred to herein, interchangeably, as "program content" and "content". Whether such interaction is desired in an audible, textual, visual or other format, devices, systems and processes are not available today which facilitate user-to-user engagement with regard to such program content and with regard to each other using a single interface or system. While some technologies available today facilitate the providing of text messages, or the like, to a broadcaster or other users during a presentation of a given program, such as a football game, such technologies do not support the providing of user comments to a user selectable group of second users. Further, such systems often require the use of multiple communications systems, such as a program providing system and a chat, messaging or similar system. Further, when provided to a broadcaster or programming provider, user comments are commonly presented, if at all, to all user receiving a given program transport stream. Accordingly, private communications, regarding given program content, amongst a user selectable group of second users is often not possible without requiring the use of separate devices, and separate communications channels, such as may occur by use of text messaging and other application programs on smartphones and similar devices.

Further, devices, systems and processes available today commonly do not facilitate the sharing of a user's comments with a geo-based grouping of users. Further, approaches today commonly do not provide for a synchronization of content and comments. Instead, comments often flow independent of a progression, or stoppage or interruption thereof, of a content stream. Accordingly, a user that has paused a content stream may be unwittingly notified of a progression of such content before having the opportunity to receive such content as it progresses, albeit on a time-delayed or other basis.

The various embodiments of the present disclosure address these and other non-trivial technical hurdles to provide devices, systems and processes for enabling a user to engage with one or more second users in a secure and private, as desired, virtual environment regarding a given program and the program content thereof. The various embodiments also facilitate the geo-grouping of users, such that content and comments may be directed to users based on one or more geographic location indicator. The various embodiments also facilitate the synchronization of content with comments, and visa-versa. Such embodiments facilitate user engagement with both a program and program content, as well as a provider of such program, by facilitating user to user engagement with each other regarding such program content.

SUMMARY

The various embodiments of the present disclosure relate in general to devices, systems and processes for providing engaging content environments. In accordance with at least one embodiment of the present disclosure, a system for facilitating a geo-location based user circle may include a hub configured to facilitate a sharing of comments between a first user and a second user via a user circle. For at least one embodiment, the first user and the second user may be selected for participation in the user circle based upon a circleID associated each of a first user device and a second user device. For at least one embodiment, a first user device, communicatively coupled to the hub, may be configured to facilitate a capture of the comments provided by the first user and a second user device, communicatively coupled to the hub, may be configured to facilitate a presentation of the comments to the second user. For at least one embodiment, a second device geoID indicates a location of the second user device.

For at least one embodiment, a system for facilitating a geo-location based user circle may include use of a second device geoID that indicates a location of the second user device is at least one of a current location, a past location, and a preferred.

For at least one embodiment, a system for facilitating a geo-location based user circle may include use of a hub configured to communicate, to a second user device, a programID identifying content associated with one or more comments. For at least one embodiment, the hub may be configured to modify the comments based on the second device geoID.

For at least one embodiment, a system for facilitating a geo-location based user circle may include use of a hub configured to modify a programID based on a second device geoID.

For at least one embodiment, a system for facilitating geo-location based providing of comments by a first user with a second user may include a first networked component, communicatively coupled to a first user device and a hub. For at least one embodiment, the first networked component may be configured to perform computer instructions for converting a first voice sample into a first transcribed text. For at least one embodiment, the computer instructions may include providing the first transcribed text to the first user device. For at least one embodiment, the first user device may include a first device audio input/output module configured to capture first user comments. The first user device may include a first hardware-software processing module configured to perform computer instructions for converting the first user comments into the first voice sample. The first user device may include a first device communications module configured to communicate the first voice sample to the first networked component. The first device communications module may be configured to receive the first transcribed text from the first networked component and communicate the first transcribed text in a first data packet to the hub.

For at least one embodiment, the hub may include a hardware-software processor module configured to perform computer instructions for associating a second user device with a second device geoID. The hub may include a hub interface module configured to communicate a second data packet to the second user device. The second data packet may include information for facilitating the presentation of the comments to the second user based on the second device geoID.

For at least one embodiment, the second user device may include a second device communications module configured to receive the second data packet and a second device text input/output module configured to present the first user comments, to the second user, in view of the second device geoID.

For at least one embodiment, a system for facilitating geo-location based providing of comments by a first user with a second user may include use of a first data packet that includes first transcribed text, a circleID and a programID. For at least one embodiment, the circleID may be associated with and identify a user circle that includes each of a first user device and a second user device. For at least one embodiment, the first user device and the second user device may each be configured for participation in the user circle.

For at least one embodiment, a system for facilitating geo-location based providing of comments by a first user with a second user may include a hub configured to perform computer instructions for identifying, based on a circleID, a second user device as a participant in a user circle. The computer instruction may include determining a second device geoID, determining whether a first transcribed text is acceptable based on the second device geoID, when acceptable, generating a second data packet that includes the first transcribed text and the second device geoID, and communicating the second data packet to the second user device.

For at least one embodiment, a system for facilitating geo-location based providing of comments by a first user with a second user may include a hub configured to determine whether a programID corresponds to a second device geoID and, when corresponding, communicate a programID in a second data packet to a second user device.

For at least one embodiment, a system for facilitating geo-location based providing of comments by a first user with a second user may include, when a first transcribed text is not acceptable as based on a second device geoID, a hub configured to obtain and communicate in a second data packet an alternative transcribed text. The alternative transcribed text may be based on the first transcribed text and modified in view of the second device geoID.

For at least one embodiment, a system for facilitating geo-location based providing of comments by a first user with a second user may include communicating alternative transcribed text that is modified to not include adult content.

For at least one embodiment, a system, for use in synchronizing program content with comments provided in a user circle may include a hub configured to perform computer instructions for establishing a user circle having members including a first user and a second user. For at least one embodiment, the computer instructions may further include associating a programming content with the user circle and facilitating synchronized exchanges of comments with the programming content between the members of the user circle. For at least one embodiment, the system may include a first user device, associated with the first user and communicatively coupled to the hub, configured to present a first synchronization of comments and the programming content to the first user. For at least one embodiment, the system may include a second user device, associated with the second user and communicatively coupled to the hub, configured to present a second synchronization of the comments and the programming content to the second user.

For at least one embodiment, a system, for use in synchronizing program content with comments provided in a user circle may include performing a first synchronization and a second synchronization which occur substantially contemporaneously. For at least one embodiment, the first synchronization and the second synchronization may occur non-contemporaneously.

For at least one embodiment, a system, for use in synchronizing program content with comments provided in a user circle may include performing computer instructions for a first synchronization that further includes computer instructions for a first synch action which, when executed, results in a pause the comments while the programming content is paused. For at least one embodiment, the computer instructions for the first synch action may be executed by the first user device. For at least one embodiment, the first synchronization include executing computer instructions for a second synch action which, when executed, result in a pause of the programming content while the comments are paused. For at least one embodiment, computer instructions for the second synch action may be executed by the first user device upon receipt of a pause content command from the user. For at least one embodiment, upon the execution of the computer instructions for the second synch action by the first user device, the second user device may be configured to substantially simultaneously execute computer instructions for the second synch action such that presentation of comments and content on each of the first user device and the second user device occur substantially contemporaneously.

BRIEF DESCRIPTION OF THE DRAWINGS

The features, aspects, advantages, functions, modules, and components of the devices, systems and processes provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

DETAILED DESCRIPTION

The various embodiments described herein are directed to devices, systems and processes for providing an engaging program environments. As described herein, the various embodiments of the present disclosure are directed to providing user selectable engaging program environments by facilitating the communication of user comments regarding program content by and between one or more users being presented with such content. For at least one embodiment, such engaging content environments may be secure environments.

Figure 1:
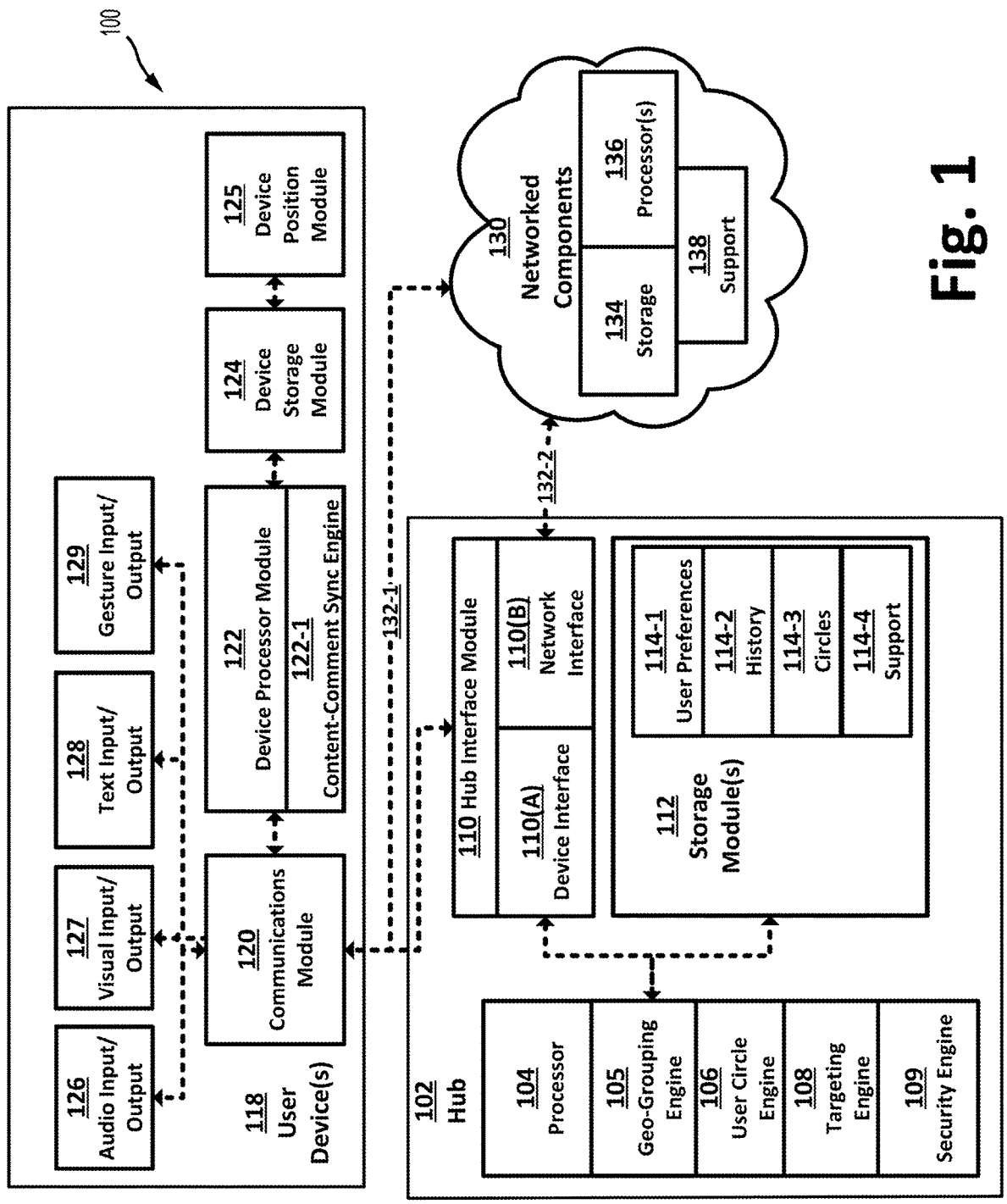
FIG. 1 is a schematic diagram illustrating a system configured in accordance with at least one embodiment of the present disclosure to facilitate the providing of engaging content environments.

As shown in FIG. 1, for at least one embodiment of the present disclosure, a system 100 for providing an engaging content environment may include a hub 102, two or more user devices 118, and one or more networked components 130.

Hub

Processor Module: The hub 102 may include one or more hub processor modules 104 configured to provide computer implemented software and hardware engines including, at least, a user circle engine 106, a targeting engine 108, and a security engine 109. Other computer implemented engines may be provided for other embodiments. For at least one embodiment, the hub 102 is configured to provide a common, virtual meeting area at which two or more users may engage with each other regarding a given content to which the users have access on a then-arising or later-arising basis.

The hub processor module 104 may be configured to provide any desired data and/or signal processing capabilities. For at least one embodiment, the hub processor module 104 may have access to one or more non-transitory processor readable instructions, including instructions for executing one or more applications, engines, and/or processes configured to instruct the processor to perform computer executable operations (hereafter, "computer instructions"). The hub processor module 104 may use any known or later arising processor capable of providing and/or supporting the features and functions of the hub 102 as needed for any given intended use thereof and in accordance with one or more of the various embodiments of the present disclosure.

For at least one non-limiting embodiment, the hub processor module 104 may be configured as and/or has the capabilities of a 32-bit or 64-bit, multi-core ARM based processor. For at least one embodiment, the hub processor module 104 may arise on one or more backend systems, such as server systems or otherwise. Computer instructions may include firmware and software instructions, and associated data for use in operating the hub 102, as executed by the hub processor module 104. Such computer instructions provide computer executable operations that facilitate one or more features or functions of a hub 102 in accordance with one or more embodiments of the present disclosure.

For at least one embodiment, the hub processor module 104 may be configured to implement computer instructions for forming, managing, and facilitating use of one or more user circles. For at least one embodiment, a user circle engine 106 may be executed by the hub processor module 104. Such user circle engine 106 is a combination of hardware and computer instructions. In other embodiments, the user circle engine 106 may be implemented by a dedicated or separate processing component. The user circle engine 106 may be configured to provide the hub 104 with capabilities of designating, defining, generating, managing, manipulating and/or providing one or more user circles. As used herein a user circle is defined to be a virtual grouping of two or more users, as established at a given point of time, via which one or more of such users may share comments with each other regarding a program being presented, program content in such program, or otherwise. A user circle may arise with respect to a given content, as further discussed below, or may arise generically and without relation to any given program or program content. A user circle may occur privately, wherein participation in the user circle is limited to a selected group of users. A user circle may occur publicly, wherein participation in the user circle is unlimited and any person having access to such user circle may join in. A user circle may occur at any desired level of openness ranging from private to public. A user circle may also occur with respect to any desired scope, type or interest in underlying programs and/or program content. That is, a user circle may be limited, and comments relating thereto being so limited, to a select topic such as a sporting event, while comments on other topics, such as politics, being forbidden. Likewise, a user circle may be designated for non-commentary uses, such as in support of support desk functions, on-line merchandising, on-line bidding/gambling, or otherwise.

For at least one embodiment, a user circle seeks to provide, in a virtual environment, a counterpart to an actual meeting of two or more persons. In such a virtual environment, persons (i.e., "users" of a user circle) can meet and exchange thoughts and ideas (i.e., "comments") regarding a topic of the user circle using one or more humanly perceptible signals, such as audible signals, (e.g., by speaking), visible signals (e.g., by showing, creating or presenting one or more visual images), by textual signals (e.g., by use of keyboards or otherwise), by motion or gestures (e.g., as may occur by pantomime, sign-language, gestures on touchpad surfaces), or otherwise. Accordingly, for at least one embodiment, a user circle engine 106 may be configured to facilitate capture and communication of one or more user comments in a virtual environment.

For at least one embodiment, the hub processor module 104 may be configured to implement computer instructions for a targeting engine 108. In other embodiments, the targeting engine 108 may be implemented by a dedicated or separate processing component. The targeting engine 108 may be configured to provide the hub 104 with capabilities of targeting one or more users for participation in one or more user circles. The targeting engine 108, working in conjunction with and/or based on data provide by one or more databases provided by a hub storage module 112, such as a user preferences database 114-1, a history database 114-2, a circles database 114-3, and/or other databases, may be configured to identify existing or to be formed circles in which one or more given users may desire to participate. As used herein, participation in a user circle may occur actively (e.g., by a user providing comments), semi-actively (e.g., by such user providing emoticons or the like in response to other's comments), or passively (e.g., by such a user receiving but not providing reactions to or thereon comments). A user's participation in a user circle, over time, may range from any of active to semi-active to passive, as desired by that given user.

Based upon an identification of user circles (existing, past and/or those to be formed), the targeting engine 108 may be configured to invite, entice, encourage, notify, inform, or otherwise bring to the attention of a given user one or more of such user circles. For example, based on a user preference for Kansas State University ("KSU") football, a user may be targeted, by the targeting engine 108, to join a user circle directed to KSU football—herein a "KSU user circle." As discussed later, such a KSU user circle may be available when content is available about KSU Football—such content being provided by a television channel, a cable channel, on-line video stream, and/or otherwise. Such content may be provided and/or available to a user using any technology (such as, linear television, streaming video, online content), and in any form (such as, audible, visual, and/or otherwise). Monetization of the targeting may occur by use, for example, of advertising revenue schemes, participation redemption factors, or otherwise.

For at least one embodiment, the hub processor module 104 may be configured to implement computer instructions for a security engine 108, such instructions may also and/or alternatively be implemented by a dedicated or separate processing component. The security engine 108 provides the hub 102 with capabilities of securing user participation in one or more user circles. The security engine 108 may be configured to address security needs, including but not limited to, securing the identify of users, securing content communicated in a user circle, securing access to the system, and other security needs. The security engine 108 may operate separately and/or in conjunction with security components provided by other components of the system 100 including those provided by user devices 118 and network components 130. Any desired know or later arising security technologies, protocols, approaches, schemes, or otherwise may be used in one or more embodiments of the present disclosure.

For at least one embodiment, the hub processor module 104 may be configured to implement computer instructions for a geo-grouping engine 105, such instruction may also and/or alternatively be implemented by a dedicated or separate processing component. For at least one embodiment, the geo-grouping engine 105 provides the hub 102 with capabilities of grouping two or more users into a user circles based upon geo-location information. The geo-grouping engine 105 may utilize geo-location information provided by any source or otherwise determinable by the hub 102. Such geo-location information may indicate a current location of a user, which may be determined, for example, based on an indication thereof by a user or based on other geo-location information provided by a user device 118 associated with a given user and/or determined using location detection technologies provided by networked components 130, such as cellular and wireless signal positioning techniques, or otherwise obtained. Such geo-location information may include an indication of a past location of a user, such as a user's prior residence, a prior city or location visited while traveling, or otherwise. Such geo-location information may include an indication of a user's preferred location(s), for example an indication of one or more favorite cities, states, restaurants, business establishments, or other locations. Such geo-location favorites information may be obtained from any source, including but not limited to, a user preferences database 114-1, a history database 114-2, each described in greater below, and/or otherwise. Other forms of geo-location information may be used, as desired for any given implementation of an embodiment of the present disclosure.

Interface Modules As further shown in FIG. 1 and for at least one embodiment of the present disclosure, a hub 102 may include a hub interface module 110. The hub interface module 110 may include one or more hub-to-device interface modules 110(A) and/or hub-to-network interface modules 110(B). The hub interface module 110 may use any known or later arising technologies for communicatively coupling the hub 102 with one or more user devices 118 and one or more networked providers 130. Non-limiting examples of such interface modules include hardware and software configured for use with one or more of the BLUETOOTH™, ZIGBEE™, Near Field Communications, Narrowband IOT, WIFI™, 3G, 4G, 5G, cellular, and other currently arising and/or future arising communications technologies. Communication links between a hub 102 and a user device 118 and/or a networked component 130 may arise directly, as illustratively shown by network connections 132-1 and 132-2, or indirectly as shown by a combination of network connections 132-2 and 132-3, wherein communications between a user device 118 and a hub 102 occur via one or more networked components 130, such as an Internet server. Any known or later arising networking and/or other communications technologies may be used to facilitate direct and/or indirect communications between hubs, user devices and networked components.

For at least one embodiment, the hub interface module 110 may be configured to include one or more data ports for establishing connections between a hub 102 and a user device 118, such as a laptop computer, a smartphone, a satellite or cable set top box (an "STB") or other device. Such data ports may support any known or later arising technologies, such as USB 2.0™, USB 3.0™, ETHERNET™, FIREWIRE™, HDMI™, wireless technologies, and others. The hub interface module 110 may be configured to support the transfer of data formatted using any desired protocol and at any desired data rates/speeds. The hub interface module 110 may be connected to one or more antennas (not shown) to facilitate wireless data transfers. Such antenna may support short-range technologies, such as 802.11a/c/g/n and others, and/or long-range technologies, such as 4G, 5G, and others. The hub interface module 110 may be configured to communicate signals using terrestrial systems, space-based systems, and combinations thereof. For example, a hub 102 may be configured to receive global positioning ("GPS") signals from a satellite directly, by use of a user device 118, or otherwise.

Storage Module(s) For at least one embodiment, the hub 102 may include one or more hub storage module(s) 112. Computer instructions, data sets and/or other information (collectively herein, "stored data") may be stored by such hub storage module(s) 112 and used by the processor 104 and/or other system hardware and/or software components to provide one or more features and/or capabilities of the various embodiments of the present disclosure. For example, the hub processor module 104 may be configured to execute, use, implement, modify or otherwise process such stored data. It is to be appreciated that the hub storage module(s)

112 (each module and/or sub-division thereof a "storage component") may be configured using any known or later arising data storage technologies. In at least one embodiment, hub storage module(s) 112 may be configured using flash memory technologies, micro-SD card technology, as a solid-state drive, as a hard drive, as an array of storage devices, or otherwise. Hub storage module(s) 112 may be configured to have any desired data storage size, read/write speed, redundancy, or otherwise. A hub storage module 112 may be configured to provide temporary/transient and/or permanent/non-transient storage of stored data, as the case may be. Stored data may be encrypted prior to and/or at the time of storage, with decryption of such stored data occurring, as needed, for use by processing module, or otherwise.

Hub storage module(s) 112 may include one or more hub databases 114 providing information, instructions and/or data for using in facilitating user circles and the use thereof. For at least one embodiment, such hub databases 114 may include a user preferences database 114-1, a history database 114-2, a circles database 114-3, and a support database 114-4. Other databases may be provided for other embodiments.

User Preference Database For at least one embodiment, information pertaining to a user and/or a population of users (where a population of users is two or more users) may be provided by a user preference database 114-1. The storage modules 112 may be configured to collect and provide data relating to one more user's preferences. The user preferences may include any information that may be and/or is useful in supporting one or more user circles. Non-limiting examples of such preferences may include demographic, psychographic, geographic, or other types of information pertaining to a user. The breadth and scope of such types of information, and the degree of specificity and/or anonymity and/or generality associated therewith, is not limited and may vary as desired with the providing, use, or otherwise of one or more user circles. Any source of information may be used in populating the user's preferences database 114-1. One non-limiting example of such as source may be a user. For example, a user's specified interest in KSU Football may be stored in the user preferences database as a college preference indicator and as a KSU indicator. Likewise, an indicator of a liked professional football team for a user, may include a designation of the 49ers™ or any other team. Similarly, a user's preference for particular types of foods, goods, locations, other program content, or otherwise, may be included in the stored data for a user's preference database. Such preference information may be populated based on user behavior, user input or otherwise. Accordingly, the various embodiments of the present disclosure are not intended to be limited to any given set or collection, or source thereof, of user preferences information, unless otherwise so expressly recited.

History Database For at least one embodiment, information pertaining to a history of user circles may be provided by a history database 114-2. The storage modules 112 may be configured to collect and provide data relating to the use, construction of and deconstruction, as appropriate, of user circles. Such data may be useful in facilitating the creation and/or use of future user circles, generating opportunities to monetize the promotion and/or advertising of content in conjunction with and/or in support or response to the use of user circles, and otherwise. The history database 114-2, for at least one embodiment, may include information obtained from a user preferences 114-1 database, where such information provides information about the users participating in one or more user circles at a desired level of anonymity. For example, a history database may include information indicating that the Denver metropolitan area contains a first number of KSU Football fans, while the San Francisco metropolitan area contains a second number of KSU Football fans. Such information being useful for targeting marketing and other uses.

Circles Database For at least one embodiment, a circles database 114-3 may be configured to collect and provide data relating to one or more presently configured user circles. Such groupings may occur automatically, based on user input, or otherwise. As discussed above, a user circle may be specific to a given content or otherwise. For example, a user circle may be formed with respect to a content genre (for example, NFL™ football games), a given subset of that genre (for example, San Francisco 49ers™ games), a given instance of the subset (for example, a 49ers™ vs Dallas Cowboys™ game), or otherwise. For at least one embodiment, the genre, subset and/or instances of content to be associated with and/or associable with a user circle may be defined to any level of generalization and/or specificity by a user, a group of users in a given user circle, a promotor or organizer of a user circle, or otherwise. For example, a broad generalization may include any content while the before mentioned specified game may include a specific instance of content. Further, it is to be appreciated that user circles, as related to content, may be generalized and/or specified (to any level thereof or there-between) to the extent that content itself may be generalized and/or specified. For at least one embodiment, a user circle may be additionally, separately, and/or alternatively specific to a given group of users, such as users A, B and C. Such grouping of users in a given user circle may, as desired, may be specific to a given content or non-specific. For example, users A, B and C form a circle for 49ers™ games, while users A, B and D form a circle for Denver Broncos™ basketball games. User circles may be created based upon any criteria or collection thereof, such as location, user preferences, user history, content to be presented, or otherwise. The circles database 114-3 facilitates the storage of data related to circles that the user circle engine 106 may utilize to facilitate use of a user circle.

For at least one embodiment, a user circle might be formed and/or formable for all content being viewed by a given user, such as user A, with other users (such as users B or C) being invited and/or capable of being invited to join in the circle with user A regarding such given content, while user D is not invited or allowed to participate. For example, and while watching an episode of Show Z, user A might desire to engage with user B regarding Show Z, but, not with user D. Accordingly, a user circle may be formed between users A and B regarding Show Z. Such circle may be formed automatically, such as when the latter of users A and B begin to watch Show Z while the other is already watching Show Z, by invitation, upon user prompting, in view of each user's preferences, based on history information, or otherwise. Thus, for at least one embodiment, user engagement with content can be facilitated by two or more users engaging with each other in one or more user circles formed about and/or concerning a given content. It is to be appreciated, the storage modules 112 in conjunction with the hub processor module 104 may be configured to collectively facilitate the creation, use, and otherwise of one or more user circles.

Support Database For at least one embodiment, a support database 114-3 may be configured to collect and provide data relating to one or more user and/or user circle support functions. Such support may arise with respect to a user circle, a program, program content, or otherwise. For example, support on the use, formation, or otherwise of a user circle may be facilitated by a support database 114-4, that in conjunction with a support engine (not shown) facilitates the providing of support with respect to user circles. For example, assistance with inviting a user to a user circle may be provided by using information, such as tutorials, provided by the support database 114-4. Similarly, a support circle may be formed with respect to a program having transmission difficulties. Likewise, a support circle may be formed when content itself invokes a need for support. For example, content regarding a traumatic event may generate a support circle providing users with virtual access to counselors, ministers, or other similar providers.

Similarly, and for at least one embodiment, the support database 114-4 may be configured to provide support features, such as tutorials or the like, that provide support for non-circle related issues, such as, how to operate a given device, without regard to a program or content. Data provided in such a support database 114-4 may be used by a user circle engine 106 to create a dynamic, or otherwise, user circle relating to the given device. For example, issues relating to use or troubleshooting of a given STB may be supported by formation of a user circle with a given person and a representative of the provider of the STB. For at least one embodiment, such representative may be an actual or a virtual assistant. Likewise, such a user circle may include other users who also have similar concerns with the STB and/or the issue then arising with such STB. The support database 114-4 may provide stored data that facilitates the providing of information relevant to the STB. Such information, for at least one embodiment, may be presented in a form of a tutorial, a virtual classroom, or otherwise. Accordingly, it is to be appreciated that the various embodiments of the present disclosure may be configured to dynamically support the formation and use of one or more user circles for any purpose, with regard to any program, content, device, topic, or otherwise, and on a static, scheduled, dynamic, or other basis and between one or more users ranging from private to fully public user circles.

Other Databases For at least one embodiment of the present disclosure, the storage modules 112 may include the use, on a transient or non-transient basis, of other databases. The stored data in such other databases being provided for execution and/or use, singularly or collectively, by one or more of a processor 104, a user device 118, and/or a networked component 130. Any type of stored data and associated computer instructions implemented for use of such stored data may be provided.

User Device

As further shown in FIG. 1, the system 100 includes user devices 118. To form a user circle, it is to be appreciated that typically two or more user devices 118 are to be utilized. However, it is to be appreciated that the retrieval and/or use of one or of the stored data, and/or the capabilities, features and functions of the various embodiments of the present disclosure may involve the use of only a single user device 118. For example, a playback of a stored user circle session may occur using only a single user device, while the participation of the two or more users in such user circle involved the participation of two or more user devices. As shown and for at least one embodiment, a user device 118 includes one or more of the following components: a user interface module 120, a user processor module 122, a user storage module 124, an audio input/output module 126, a visual input/output module 127, a text input/output module 128, and a motion input/output module 129. Other modules (not shown) may be used, as desired for a given embodiment of the present disclosure. The user device 118 may be provided in any desired form or arrangement, including but not limited to, a STB, a smartphone, a laptop computer, a notebook computer, a tablet, a virtual reality device, or other device configurable for use in facilitating user circles and the participation therein and/or use thereof by a given user.

Communications Module For at least one embodiment, a user device 118 may include a communications module 120 configured to facilitate communications by and between a user device 118 and one or more of a hub 102, a second user device, and one or more networked components 130. The communications module 120 may include one or more hub interface modules (not shown) and/or network interface modules. The communications module 120 may use any known or later arising communications and/or connectivity technologies, as implemented in hardware, software and combinations thereof. Non-limiting examples of such interface modules include hardware and software configured for use with one or more of the BLUETOOTH™, ZIGBEE™, Near Field Communications, Narrowband IOT, WIFI™, 3G, 4G, 5G, cellular, Ethernet, and other currently arising and/or future arising communications technologies.

Device Processor Module For at least one embodiment, a user device 118 may include a device processor module 122. The device processor module 122 may be configured as and/or have the capabilities of a 32-bit or 64-bit, multi-core ARM based processor. The device processor module 122 may be configured for independent use of the user device 118 and/or assisted use of the user device 118, wherein assisted use involves the off-loading and/or shared processing of one or more computer instructions, data sets, or other information by one or more of a hub 102 and a networked component 130.

Content-Comment Sync Engine For at least one embodiment, a device processor module 122 may be configured to execute computer instructions for a content-comment synchronization engine (the "sync engine") 122-1. The computer instructions for the sync engine 122-1 may also and/or alternatively be implemented by a dedicated or separate processing component. For at least one embodiment, the sync engine 122-1 provides a user device 118 with the capabilities of synchronizing content with comments associated with a given user circle. For at least another embodiment, the sync engine 112-1 may be executed, in whole or in part, by a hub 102, a networked component 130 and/or a combination of any, if not all, of one or more of a user device 118, a hub 102 and a networked component 130.

For at least one embodiment, a synchronizing of content with comments may occur using one or more synchronization schemes. A synchronization scheme may be user defied, user configurable, configurable based upon user usage history or other data, and/or otherwise manually, semi-manually and/or automatically configurable. A synchronization scheme may be configured based upon any criteria, including but not limited to, a user circle with which the scheme is to be associated, a programID, an amount of content and/or comments to be synchronized, a source or location at which the synchronization is to occur, and otherwise. Capabilities and resources associated with a given synchronization scheme may be provided in view of numerous factors including but not limited to storage (by buffer or otherwise) available on a device 118, at a hub 102 or by a networked component 130, network and device bandwidths, practical considerations, such as the quantity, quality or amount of comments being received relating to the content or a portion thereof, and otherwise. It is to be appreciated that the synchronization of content and comments may occur in any desired relationship, at any time, and in accordance with any desired synchronization scheme, including schemes provided extemporaneously.

For a first synchronization scheme, a presentation of content influences a presentation of comments. More specifically, a pausing, fast forwarding, reversing, jumping, or other action related to a program and/or its content influences actions pertaining to comments associated with such content. For example, when, where and how one or more comments associated with such program are processed, presented, stored or otherwise managed by one or more of a user device 118, a hub 102 or a networked component 130 are influenced by, if not controlled in view of, parameters specified in association with such a first synchronization scheme. These parameters and their influence on comment presentation and other operations may vary widely and may be in accordance with a user's desires, a user device's constraints, a hub's constraints, network constraints, or otherwise.

For example and in accordance with a first synchronization scheme, at least one of a user device 118 and/or a hub 102 may be configured to execute computer instructions providing that when content is paused by a given user device (for example, in furtherance of a user's need for a personal break, such as one arising during a commercial break in the program content) at least one first synch action occurs. A first synch action may include, for example, pausing of a presentation of a comment stream while the content stream is paused on that given user's device. Another first synch action may include, for example, not pausing a comment stream, but, obscuring of one or more portions of such comments. Other first synch actions may occur and it is to be appreciated that any given first synchronization scheme may be configured to include any given first sync action(s). Likewise, it is to be appreciated that any given first sync action may include operations occurring on one or more of a user device 118, a hub 102, and/or a networked component 130.

For a second synchronization scheme, at least one of a user device 118 and/or a hub 102 may be configured to execute computer instructions providing for a sequencing of comments by a given user device resulting in at least one second synch action occurring. For example, while inputting a comment, a user device may be configured to pause a presentation of content. Per this non-limiting example, a device processor module 122, alone and/or in conjunction with a hub 102 and/or a networked component 130, may be configured such that, for a second sync action, a comment related activity results in a content related activity. One non-limiting example of where use of a second sync action may be desired is when a user desires to engage in other activities that may not be directly related to the content, but are related to a comment, with the user desiring to pause the program while the comment related activities occur. For example, a user may desire to engage in comment related activities such as on-line shopping, polling, gambling, and otherwise, without missing program content. It is to be appreciated that any given second synchronization scheme may be configured to include any given second sync action(s). Likewise, it is to be appreciated that any given second sync action may include operations occurring on one or more of a user device 118, a hub 102, and/or a networked component 130.

For a third synchronization scheme, a pausing of content or comments on a first user device may result in one or more third synch actions occurring on one or more other user devices associated with a given user circle. For example, a third sync action may be configured such that when content is paused on a first user device (such as a host's device), presentation of content and/or comments is paused across all other user devices within that given user circle. Similarly, a third sync action may be configured such that only comment entry is paused within a given user circle while content presentation is paused on one or more user devices associated with that given user circle. Other third sync actions may be used and configured, as desired for any implementation of an embodiment of the present disclosure. Accordingly, it is to be appreciated that any given synchronization scheme may be configured to include any given first, second and/or third sync action(s). Likewise, it is to be appreciated that any given sync action may include operations occurring on one or more user devices 118, hubs 102, and/or networked components 130.

Device Storage Module For at least one embodiment, a user device 118 may include a device storage module 124. The device storage module 124 is a storage component and may be configured using any known or later arising data storage technologies. In at least one embodiment, the device storage module 124 may be configured using flash memory technologies, micro-SD card technology, as a solid-state drive, as a hard drive, as an array of storage devices, or otherwise. The device storage module 124 may be configured to have any desired data storage size, read/write speed, redundancy, or otherwise. The device storage module 124 may be configured to provide temporary/transient and/or permanent/non-transient storage of stored data, as the case may be. Stored data may be encrypted prior to and/or at the time of storage, with decryption of such stored data occurring, as needed, for use by processing module, or otherwise. The device storage module 124 may include one or more collections of data provided by the user preferences database 114-1, the history database 114-2, the circles database 114-3, the support database 114-4, and other databases (not shown). For at least one embodiment, a device storage module 124 may be configured to store data sets relevant to a given user of a given user device, such data sets being generated locally on the user device and/or obtainable from one or more of the before mentioned databases provided by a hub 102. Further, it is to be appreciated that the device storage module 124 may also be configured to provide computer instructions and/or data sets which facilitate use of a user device 118 for a user circle.

Device Position Module For at least one embodiment, a user device 118 may include a device position module 125 configured to identify a position of a given user device 118. For embodiments wherein a given user device is generally non-mobile, such as in the case of the use of a STB in a home or office environment, the device position module 125 may not be utilized, with the location information being already known to a hub 102 or other networked component 130 based upon subscription information, IP address information or other fixed, non-varying indicators of a position of that given user device 118. Contrarily, where a user device 118 is mobile, such as may arise in the use of a smartphone, laptop computer, notebook computer, tablet or other mobile device, an active device position module 125 may be utilized. Such device position module 125 may be configured to use any device position determining technology, including but not limited to, global positioning technologies, IP addressing, user input (e.g., a user inputs their location by use of any user compatible input format), or otherwise. Position information generated and/or captured by a device position module 125 may be utilized by device processor module 122 and, when communicated to, one or more of a hub 102 and a networked component 130 to facilitate use of user circles.

Audio Input/output Module For at least one embodiment, a user device 118 may include an audio input/output module 126 configured to support the providing of audible signals between a user and a user device 118. Such audio signals may include spoken text, sounds, or any other audible information. Such audible information may include one or more of humanly perceptible audio signals, where humanly perceptible audio signals typically arise between 20 Hz and 20 KHz. For at least one embodiment, the range of humanly perceptible audio signals may be configurable to support an audible range of a given individual user.

An audio input/output module 126 generally includes hardware and software (herein, "audio technologies") which supports the input and (as desired) output of audible signals to a user. Such audio technologies may include technologies for converting human speech to text, text to speech, translation from a first language to one or more second languages, playback rate adjustment, playback frequency adjustment, volume adjustments and otherwise. Non-limiting examples of audio technologies that may be utilized in an audio input/output module 126 include Google Voice, SFTranscription, Brightscript, Google Assistant, and others. In at least one embodiment, an audio input/output module 126 may be configured to use one or more microphones and speakers to capture and present audible information to user. Such one or more microphones and speakers may be provided by a given user device itself or by a device communicatively couple additional audible device component, for example, by earbuds may be communicatively coupled to a smartphone, with the earbuds functioning as an audio input/output module 126 and capturing and presenting audio sounds to and from a user, while the smartphone functions as a user device 118. Accordingly, it is to be appreciated that any existing or future arising audio input/output devices, systems and/or components may be utilized by and/or in conjunction with a user device 118 to facilitate the use of user circles. In at least one embodiment of the present disclosure, users provide their comments audibly for presentation to other users in a user circle and receive representations of other user's comments also audibly.

For at least one embodiment, an audio input/output module 126 may be configured to automatically recognize and capture comments spoken by a user and intended for sharing in a user circle. Such identification may occur as a default setting of the audio input/output module 126 into a "capture" mode, based upon analysis and recognition of spoken comments as being intended for one or more second users in a user circle, or otherwise. For example, a comment such as, "Bill, that is just wrong," where "Bill" is the name of a second user in a user circle, may be automatically captured and shared by an audio input/output module 126. The analysis and determination of which captured sounds to share with a user circle may be accomplished by a user device 118 itself, by a hub 102, by a networked component 130, and/or by a combination of any of the foregoing. For at least one embodiment, a priming key word, such as "Hey Piazza" may also and/or alternatively be used to designate which audio comments, by a first user, are to be shared with one more second users in a user circle. While the use of priming key words are supported, for at least one embodiment, the system 100 is configured to automatically recognize and share users' comments throughout a user circle as if an actual, physically present meeting of the users was occurring versus the virtual meeting of such users provided by the use of user circles and embodiments of the present disclosure.

Visual Input/output Module For at least one embodiment, a user device 118 may include a visual input/output module 127 configured to support the providing of visible signals between a user and a user device 118. Such visible signals may be in any desired form, such as still images, motion images, augmented reality images, virtual reality images and otherwise. Such visible information may include one or more of humanly perceptible visible signals. For at least one embodiment, a visual input/output module 127 may also be configured to capture non-humanly visible images, such as those arising in the X-ray, ultra-violet, infra-red or other spectrum ranges. Such non-humanly visible images may be converted, as desired, into humanly visibly perceptible images by one or more of a user device 118, a hub 102 and/or a networked component 130. A visual input/output module 127 generally includes hardware and software (herein, "visible technologies") which supports the input by and (as desired) output of visible signals to a user. Such visible technologies may include technologies for converting images (in any spectrum range) into humanly perceptible images, converting content of visible images into a given user's perceptible content, such as by character recognition, translation, playback rate adjustment, playback frequency adjustment, and otherwise. A visual input/output module 127 may be configured to use one or more display devices configured to present visible information to user. A visual input/output module 127 may be configured to use one or more image capture devices, such as those provided by lenses, digital image capture and processing software and the like which may be provided by a given user device itself or by a communicatively coupled additional image capture device component, for example, a remote camera in a vehicle or otherwise. Accordingly, it is to be appreciated that any existing or future arising visual input/output devices, systems and/or components may be utilized by and/or in conjunction with a user device 118 to facilitate the capture, communication and/or presentation of visual information in conjunction with one or more user circles. In at least one embodiment of the present disclosure, users provide their comments visibly for presentation to other users in a user circle and receive representations of other user's comments visibly. As discussed above with regard to audible comments, such visible comments may be captured automatically, upon use of one or more priming key images, or otherwise.

Text Input/output Module For at least one embodiment, a user device 118 may include a text input/output module 128 configured to support the providing of textual information by a user using a user device 118. Such textual information signals may be in any desired language, format, character set, or otherwise. Such textual information may include one or more of humanly perceptible characters, such as letters of the alphabet or otherwise. For at least one embodiment, a text input/output module 128 may also be configured to capture textual information in first form, such as a first language, and convert such textual information into a second form, such as a second language. A text input/output module 128 generally includes hardware and software (herein, "textual technologies") which supports the input by and (as desired) output of textual information signals to a user. Such textual technologies may include technologies for inputting, outputting, and converting textual content into a given user's perceptible content, such as by character recognition, translation, size/font adjustment, and otherwise. In at least one embodiment, a text input/output module 128 may be configured to use an input device, such as a keyboard, touch pad, mouse, or other device to capture textual information. It is to be appreciated that any existing or future arising text input/output devices, systems and/or components may be utilized by and/or in conjunction with a user device 118 to facilitate the use of textual information in one or more user circles. In at least one embodiment of the present disclosure, users provide their comments textually for presentation to other users in a user circle and receive representations of other user's comments textually. As discussed above with regard to audible comments, such textual comments may be captured automatically, upon use of one or more priming key words or textual characters or strings thereof (e.g., the depressing of a "comment" button being indicative that a following string of characters are intended as comments for the user circle), or otherwise.

Gesture Input/output Module For at least one embodiment, a user device 118 may include a gesture input/output module 129 configured to support the providing of gesture information, such as sign language, by a user using a user device 118. Such gesture information signals may be in any desired form or format. Such gesture information may include one or more of humanly perceptible characters, such as those provided by sign language. For at least one embodiment, a gesture input/output module 129 may also be configured to capture a user's motions to control one or more aspects of a user device, examples of such motions including those commonly used on smartphone touch interfaces. A gesture input/output module 129 generally includes hardware and software (herein, "gesture technologies") which supports the input by and (as desired) output of gesture information signals to a user. Such gesture technologies may include technologies for inputting, outputting, and converting gesture content into any given form, such as into textual information, audible information, visual information, device instructions or otherwise. In at least one embodiment, a gesture input/output module 129 may be configured to use an input device, such as a motion detecting camera, touch pad, mouse, motion sensors, or other devices configured to capture motion information. It is to be appreciated that any existing or future arising gesture input/output devices, systems and/or components may be utilized by and/or in conjunction with a user device 118 to facilitate the use of gesture information in one or more user circles. In at least one embodiment of the present disclosure, users provide one or more of their comments via gestures for presentation to other users in a user circle and receive representations of other user's comments in a second desired format, such as audibly, visually, via characters, or otherwise. Thus, it is to be appreciated that the various embodiments of the present disclosure may be configured to use one or more of the described above and/or other input/output devices to facilitate user participation in a user circle. Such input/output devices may be used individually or in any desired combination thereof. As discussed above with regard to audible comments, such gesture comments may be captured automatically, upon use of one or more priming key gestures (e.g., the waving of one's hand in a certain manner, or nodding or shaking one's head), or otherwise.

Networked Components

As shown in FIG. 1, the system 100 may also include one or more networked components 130. Non-limiting examples of such networked components include network storage modules 134, network processor modules 136, and network support modules 138.

Network Storage Modules For at least one embodiment, networked storage modules 134 may be communicatively coupled to the hub 102 and/or one or more user devices 118, by one or more direct or indirect connection(s) 132, or combinations thereof. The networked storage modules 134 may be provided via any networked devices and/or systems, such as those communicatively accessible via the Internet, or other networking technologies including but not limited to local, regional, private, public or other networking technologies. It is to be appreciated that the networked storage modules 134 are also referred to herein as a storage component and, like hub storage modules 112 and device storage modules 124, may be configured using any known or later arising data storage technologies. In at least one embodiment, a network storage module 134 may be configured using flash memory technologies, micro-SD card technology, as a solid-state drive, as a hard drive, as an array of storage devices, or otherwise. A network storage module 134 may be configured to have any desired data storage size, read/write speed, redundancy, or otherwise. A network storage module 134 may be configured to provide temporary/transient and/or permanent/non-transient storage of one or more data sets, computer instructions, and/or other information.

Network Processor Module For at least one embodiment, one or more network processor modules 136 may be configured to execute computer instructions which facilitate in whole, or in part, the use of user circles. Network processor modules 136 may use any known or later arising network and/or server based technologies. Such network processor modules 136 may be configured to support and/or perform, separately and/or in conjunction with one or more of a hub 102 and a user device 118, one or more computer instructions utilized in providing user circles. Non-limiting examples of computer instructions performed by a network processor module 136 to facilitate use of user circles include conversion of speech to text and translation of text from a first language to a second language.

Network Support Module For at least one embodiment, one or more network support modules 138 may be configured to execute computer instructions which facilitate in whole, or in part, the use of user circles. Network support modules 138 may use any known or later arising network and/or server based technologies that facilitate support of a user with respect to a user circle or other technology issue. Support functions supported may include, but are not limited to, the before mentioned tutorials, virtual classrooms, helpdesk functions, and otherwise.

Figure 2:
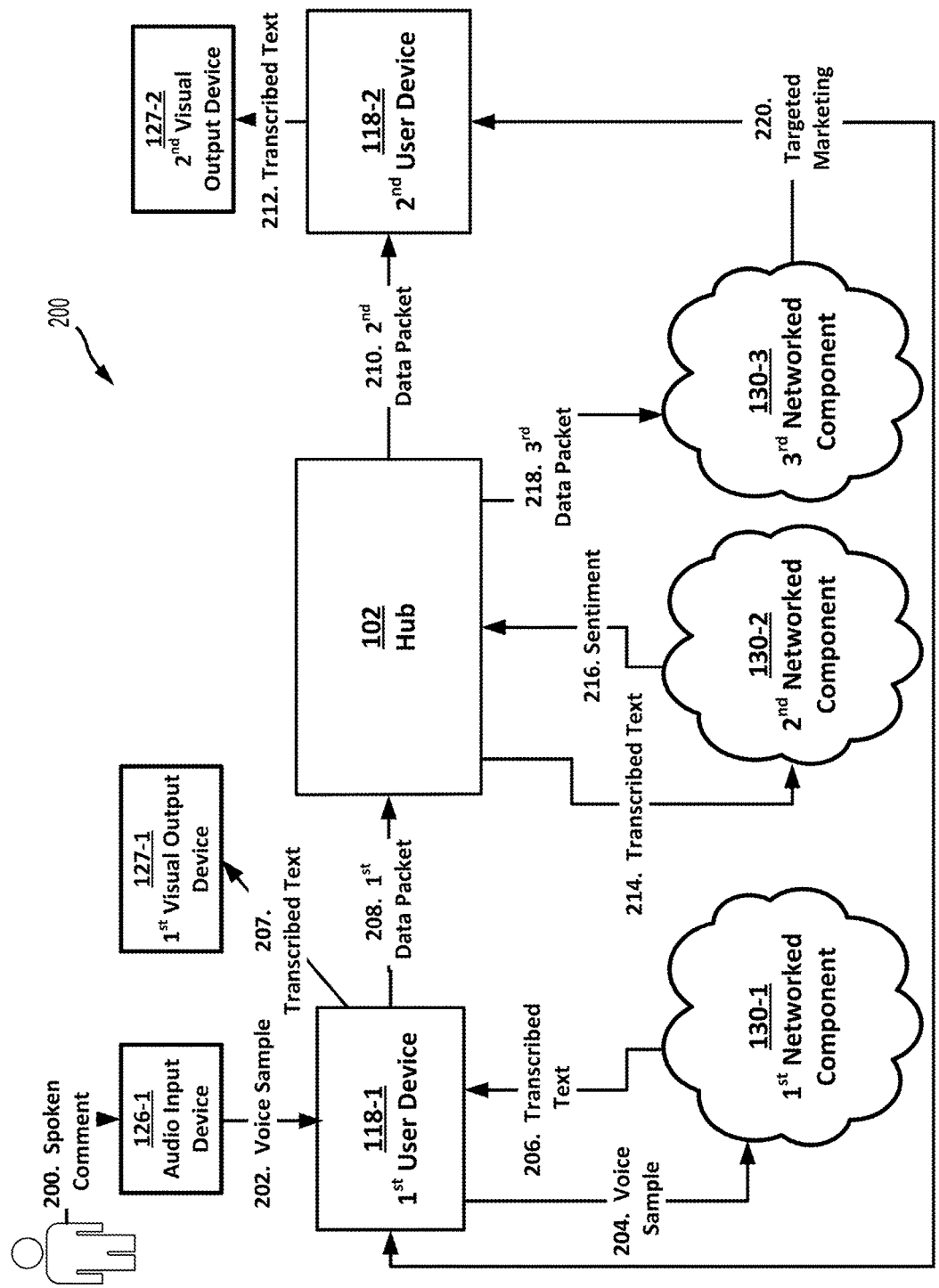
FIG. 2 is a schematic flow chart of a process for using a user circle to provide comments in accordance with at least one embodiment of the present disclosure.

In FIG. 2 and for at least one embodiment of the present disclosure, a process for using a user circle is shown. As shown, the system 200 may be configured to include a hub 102, a first user device 118-1 coupled to an audio input device 126-1 and first visual output device 127-1, at least one second user device 118-2 coupled to a second visual output device 127-2, a first networked component 130-1, a second networked component 130-2 and a third networked component 130-3. It is to be appreciated, however, that while shown as three separate networked components, such components may be combined as desired.

Per Operation 200 and using, for example, the audio input device 126-1, a user may input a comment regarding a program, such as a television program being presented via the first user device 118-1. The user comment may be captured and processed by the audio input device 126-1 into a voice sample. The voice sample may be in a digital form, may be compressed and/or otherwise processed using known audio input processing technologies.

Per Operation 202, the voice sample is communicated to the first user device 118-1, which for this illustrative embodiment only, is assumed to lack the capability to transcribe the voice sample.

Per Operation 204, the first user device 118-1 communicates the voice sample to a first networked component 130-1.

Per Operation 206, the first networked component 130-1 transcribes the voice sample into transcribed text and communicates the transcribed text back to the first user device 118-1.

Per Operation 207, the first user device 118-1, upon receiving the transcribed text may output the transcribed text for presentation via the first visual output device 127-1.

Per Operation 208, the first user device 118-1 communicates to the hub 102 the received transcribed text in a first data packet including at least one of a circle identifier (a "circleID") and a program identifier (a "programID"). The circle identifier indicates the user circle(s) (there may be one) to which the user's comment is intended to be distributed. As discussed above, a circle may be limited to designated users, private, public or otherwise. The circleID facilitates the providing of the comment to those users which the first user desires to receive such comment. The programID identifies an underlying program, e.g., a television show, a radio show, other content, with respect to which the first user is presently being presented and with respect to which the first user is providing the commentary.

Per Operation 210, upon receiving the first data packet, the hub 102 determines which user(s) (there may be one) to whom the first user's commentary is to be provided. The hub 102 then generates and communicates a second data packet to those designated users. For at least one embodiment, when geo-location information is not utilized, the second data packet may include the same circleID, programID and transcribed text as the first data packet. For at least another embodiment, the second data packet may include different and/or additional circleID, programIDs, and/or transcribed text. Such different and/or additional circleID(s) may arise, for example, where a comment is a public comment and multiple circles are used to include multiple users.

When geo-location information is utilized, the hub may generate a second data packet that includes a geographic identifier (a "geoID") designating geo-location information associated with the second data packet. Such geoID may be associated with additional and/or different circleIDs and/or programIDs. When associated with additional and/or different circleIDs, a geoID may designate and/or group certain users into specific user circles based on geo-location information. When associated with additional and/or different programIDs, a geoID may be used to identify alternative content to be provided to a user. The alternative content may be further associated with a circleID. A need for such alternative content, as indicated by a different circleID and/or a different programID, may arise when a need for different content arises because of location or other external factors. For example, the presentation of adult content in a user's current home location may influence use of a first programID, whereas that same user's then presence on an airplane may influence use of less mature content, as associated with a second programID. Similar concerns may arise with respect to a circleID. That is, the underlying program may be associated with different programIDs, providing different versions of such content. Likewise, different circleIDs may be associated with different comment filters. The geo-location information, as specified by a geoID, may be used to influence which of potentially two or more programIDs and/or circleIDs a user device uses when present content and/or comments to such user at a given time. Similarly, different programIDs, as influenced by geoIDs, may arise due to the vagaries of content distribution using, e.g., different local television feeds, different networks, and otherwise being associated with for different locations.

Likewise, a need for additional and/or different transcribed text may arise based on a geoID. Such additional and/or different transcribed text may be associated with different geoIDs and may be provided to a given user device based on geo-location information associated with such user. For example, a second user may prefer to receive comments in a different language while traveling. Geo-location information for the user and geoIDs provided in the second data packet may be used to facilitate selection and presentation of such different content and/or different comments. In short, the various embodiments of the present disclosure enable users to participate in user circles that correspond to a geoID that indicates content and/or comments associated with geo-location information.

Per Operation 212, upon receiving the second data packet, the second user device 118-2 outputs the transcribed text to a second visual output device 127-2. In outputting the transcribed text, the second user device 118-2 may be configured to automatically or when permitted tune the second user device 118-2 to the program content identified by the programID and also to present an interface providing the user circle identified by the circleID.

Per Operation 214, the hub 102 may also be configured to communicate the transcribed text for further analysis to a second networked component 130-2 (assuming the capability thereof does not reside on the hub itself). The further analysis may include any analysis desired based on the transcribed text. Such analysis may include, but is not limited to, sentiment analysis. Non-limiting examples of sentiment analysis includes analysis of the transcribed text for a user sentiment regarding the underlying comment based upon the words spoken. It is to be appreciated that other forms of analysis may be performed on the transcribed text and/or the voice sample itself including, but not limited to, analysis based upon the rate of speech, the volume of speech, and otherwise. Likewise, other forms of content analysis may be performed on the voice sample and/or the transcribed text by a hub 102, a networked component 130, a user device 118 and/or a combination of any of the foregoing. Non-limiting examples of such analysis include demographics analysis (e.g., are the comments indicative of a level of education), psychographic analysis (e.g., are the words spoken indicative of the user's mental status), geographic analysis (e.g., are the words spoken indicative of a present location of the first user), and otherwise.

Per Operation 216, the second networked component 130-2 performs the desired analysis of one or more of the transcribed text and/or the voice sample and outputs a sentiment data packet to the hub 102.

Per Operation 218, upon receiving the sentiment data packet, the hub 102 generates and communicates a third data packet to a third networked component 130-3. It is to be appreciated that communication of the second data packet and the third data packet may occur at substantially the same time or at any desired time, with either data packet preceding the other, as desired for a given embodiment. For at least one embodiment, the third data packet may include a programID and the sentiment data provided by the second networked component 130-2 in the sentiment packet. For at least one embodiment, the sentiment data may also be provided in the second data packet to the second user device 118-2 for processing and presentation thereof to the second user. Such sentiments may be presented, for example, by generation of one or more corresponding emoticons.

Per Operation 220, the contents of the third data packet may be processed by the third networked component 130-3 to generate one or more targeted marketing packets. Such targeted marketing packets may be provided during presentation of the underlying content or later. Such targeted marketing packets may be related to the programID or unrelated. The one or more targeted marketing packets may be communicated to one or more of the first user, the second user and other users.

User Circle Operating Concepts For at least one embodiment, a device processor module 122 or other component of system 100 may be configured to include one or more device settings that enable the use of user circles. For example, a global setting may be enabled that, when the user device 118 is powered into an "on" operating state, the use of user circles is automatically enabled. In other embodiments, prompts and/or messages may be communicated to a user to enable user circles, when desired.

For at least one embodiment, an underlying program (e.g., a sports program on a cable television feed) may have one or more default user circles associated therewith. Such one or more default user circles may be public circles or semi-public circles, where a semi-public circle is limited to certain classes of users based upon one or more user preferences, user history, or other information. The device processor module 122 may be configured to automatically identify the one or more default user circles when a user of the user device 118 selects that underlying program. For extremely popular events, such as the NFL SUPER BOWL™, public circles may be used based on a user's geographic location, with different public circles being available to different users in different areas. Various networking considerations may be taken into consideration when assigning public circles to various users, such as network latency, network bandwidth, level of activity in a given circle, user preferences, and otherwise. For at least one embodiment, known load sharing technologies may be used to distribute and manage the use of public user circles. Such load-sharing may occur at one or more hubs 102 and/or one or more networked components 130.

Further, it is to be appreciated that such selection of a given underlying program or content may occur manually, semi-automatically (such as, by use of one or more timers), automatically (such as, by a given user device 118 itself selecting a program or content for presentation to that user at that time), or otherwise. The presentation of the one or more default user circles so identified and associated with that underlying program and/or content may likewise be selectable by a user, with such selection itself occurring manually (e.g., by a user selecting the same using a remote, voice command or otherwise), automatically, or otherwise.

When a user circle is selected, the device processor module 122, in conjunction with one or more of the other components of the system including but not limited to the audio input/output module 126 and the visual input/output module 127, suitably generates one or more human perceptible outputs that facilitate a given user's participation in a user circle. Such participation may occur by providing audible, visible, text, gesture and/or other signals to such user. For audible perceptible user circle signals, the device processor module 122, in conjunction with the audio input/output module 126, adjust each of the user circle comment signals and the audio signals of the underlying content so that the user comments can appear as if local, versus virtual, discussion of the underlying content was occurring. For at least one embodiment, such adjustments may include use of surround sound channel processing technologies, or otherwise. When multiple users participate in a user circle, such adjustments may include the presentation, relative to a first user, of a second user's comments from a different audio direction than those of a third user's comments. Other audible processing technologies may be used for other embodiments.

Various mechanisms may be used to enable a user to switch between two or more user circles, as relating to a given underlying content, when such two or more user circles are available. These mechanisms include, but are not limited to, audible, visible, text, gesture and/or other inputs, such inputs being provided to a device processor module 122 via one or more of an audio input/output module 126, visual input/output module 127, text input/output module 128, gesture input/output module 129, or otherwise.

As discussed above, one or more user circles may include a support circles. Support circles facilitate troubleshooting and resolution of issues arising with respect to a user device 118, a user circle, a program, content, or otherwise. The accessing of support circles may occur manually or automatically. For example, when an issue arises with the presentation of a program, identification of a support circle regarding such issue may be automatically presented to a user of a given user device 118 then receiving or trying to receive such program. Upon selection of such support circle, a user circle facilitating the exchange of comments by a user with support personnel may occur. Such support user circle may occur privately, semi-privately (where only one or more users in a then arising private circle and designated support staff can participate), publicly, or otherwise. Support user circles may also be provided on-demand, as contrasted with in response to an abnormality in a program or otherwise. For example, upon user request a support user circle may be presented in which a user can add/delete/modify subscription packages, obtain use of other services (such as on-line purchasing, on-line bidding, and other on-line services), and the like.

For at least one embodiment, the device processor module 122, in conjunction with at least the communications module 120, may be configured to facilitate registration of a user with a hub 102 providing access to user circle features and functions. Such registration may include the providing of at least a minimal set of information needed to establish a user's preferences, for populating of a user preferences database 114-1, and an identification of one or more user circles that a newly registering user may desire to access. Such identification may be provided by the providing of any desired information, such as types of program and/or content at a level of desired granularity, such as sports, leagues, teams, non-violent, and otherwise, identification one or more "friends" with whom a user may desire to share comments, times for use of user circles, and otherwise. It is to be appreciated that the entry of such user information may occur using any desired input device, such as those described below in conjunction with the audio input/output module 126, visual input/output module 127, text input/output module 128, gesture input/output module 129, and otherwise.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The use of the terms "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes only and are not intended to be limiting to any orientation or configuration of any elements or sequences of operations for the various embodiments of the present disclosure. Further, the terms "coupled", "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

Further, a reference to a computer executable instruction includes the use of computer executable instructions that are configured to perform a predefined set of basic operations in response to receiving a corresponding basic instruction selected from a predefined native instruction set of codes. It is to be appreciated that such basic operations and basic instructions may be stored in a data storage device permanently and/or may be updateable, but, are non-transient as of a given time of use thereof. The storage device may be any device configured to store the instructions and is communicatively coupled to a processor configured to execute such instructions. The storage device and/or processors utilized operate independently, dependently, in a non-distributed or distributed processing manner, in serial, parallel or otherwise and may be located remotely or locally with respect to a given device or collection of devices configured to use such instructions to perform one or more operations.

What is claimed is:

1. A system facilitating a geo-location based user circle, comprising:
    a hub:
        facilitating a sharing of user comments between a first user and a second user via a user circle;
            wherein the first user and the second user are selected for participation in the user circle based upon a circleID associated with a first user device and a second user device; and
        delimiting sharing of portions of the user comments in view of a second device geoID associated with the second user device;
    a first user device, communicatively coupled to the hub, facilitating a capture of the user comments provided by the first user; and
    a second user device, communicatively coupled to the hub, facilitating a presentation of non-delimited user comments to the second user; and
    wherein the second device geoID indicates a location of the second user device;
    wherein the hub shares an alternative comment with the second user device; and
        wherein the alternative comment is shared in place of one or more delimited user comments.

2. The system of claim 1,
    wherein the second device geoID indicates the location of the second user device is at least one of a current location, a past location, and a preferred location.

3. The system of claim 1,
    wherein the hub communicates, to the second user device, a programID identifying content associated with the user comments.

4. The system of claim 1,
    wherein, in view of the second device geoID, the alternative comment is shared with the second user device.

5. The system of claim 1,
    wherein the alternative comment is shared with the second user device when at least some of the first user comment exceeds at least one boundary of the user circle.

6. A system facilitating a geo-location based user circle, comprising:
    a hub:
        facilitating a sharing of user comments between a first user and a second user via a user circle;
        wherein the first user and the second user are selected for participation in the user circle based upon a circleID associated with a first user device and a second user device; and
        delimiting sharing of portions of the user comments in view of a second device geoID associated with the second user device;
    a first user device, communicatively coupled to the hub, facilitating a capture of the user comments provided by the first user; and
    a second user device, communicatively coupled to the hub, facilitating a presentation of non-delimited user comments to the second user; and
    wherein the second device geoID indicates a location of the second user device;
    wherein the hub modifies the user comments based on the second device geoID.

7. The system of claim 6,
    wherein the hub modifies the programID based on the second device geoID.

8. A system facilitating a geo-location based user circle, comprising:
    a hub:
        facilitating a sharing of user comments between a first user and a second user via a user circle;
            wherein the first user and the second user are selected for participation in the user circle based upon a circleID associated with a first user device and a second user device; and
        delimiting sharing of portions of the user comments in view of a second device geoID associated with the second user device;
    a first user device, communicatively coupled to the hub, facilitating a capture of the user comments provided by the first user; and
    a second user device, communicatively coupled to the hub, facilitating a presentation of non-delimited user comments to the second user; and
    wherein the second device geoID indicates a location of the second user device;

wherein the hub shares an alternative content with the second user device; and wherein the alternative content is shared instead of one or more delimited user comments.

9. The system of claim 8, wherein, in view of the second device geoID, the alternative content is shared with the second user device.

10. A process, for facilitating a geo-location based user circle, comprising:

associating a first user device with a user circle;

associating a second user device with the user circle;

receiving a comment from the first user device;

receiving a second geoID for the second user device;

determining, in view of the second geoID and the user circle, if the comment is acceptable to provide to the second user device; and providing, when the comment is acceptable, the comment to the second user device;

wherein the first user device is associated with a first geoID;

wherein the first geoID associates, for a given content, a first programID identifying a first version of the given content available to the first user device;

wherein the second geoID associates, for the given content, a second programID identifying a second version of the given content available to the second user device; and wherein the first version of the given content differs from the second version of the given content.

11. The process of claim 10, further comprising:

wherein the first user device and the second user device are selected for participation in the user circle based upon a circleID associated with the first user device and the second user device.

12. The process of claim 10, wherein the second geoID indicates a current location of the second user device.

13. The process of claim 10, wherein the first version of the given content is for a first local television feed associated with the first geoID; and wherein the second version of the given content is for a second local television feed associated with the second geoID.

14. The process of claim 10, further comprising:

providing, when the comment is not acceptable, an alternative comment to the second user device.

15. A process, for facilitating a geo-location based user circle, comprising:

associating a first user device with a user circle;

associating a second user device with the user circle;

receiving a comment from the first user device;

receiving a second geoID for the second user device;

determining, in view of the second geoID and the user circle, if the comment is acceptable to provide to the second user device;

providing, when the comment is acceptable, the comment to the second user device;

determining, in view of the second geoID, whether a given content is acceptable to provide to the second user device;

providing, when the given content is acceptable, the given content to the second user device;

identifying, when the given content is not acceptable, an unacceptable portion of the given content; and second providing, when the given content is not acceptable, alternative content for the unacceptable portion of the given content.

16. The process of claim 15, further comprising:

wherein the determining of whether the given content is acceptable further comprises:

receiving a transcription of an audible portions of the given content into transcribed text; and determining whether the transcription includes words delimited by at least one of the user circle and the second geoID.

17. A computer readable medium including non-transient computer processor instructions which, when executed by a hardware processor, facilitate data operations comprising:

associating a first user device with a user circle;

associating a second user device with the user circle;

receiving a comment from the first user device;

receiving a second geoID for the second user device;

determining, in view of the second geoID and the user circle, if the comment is acceptable to provide to the second user device; and when the comment is acceptable, providing the comment to the second user device;

associating with a first geoID for the first user device, with respect to a given content, a first programID identifying a first version of the given content available to the first user device;

associating with the second geoID, for the given content, a second programID identifying a second version of the given content available to the second user device;

wherein the first version of the given content differs from the second version of the given content;

wherein the first version of the given content is for a first local television feed associated with the first geoID; and wherein the second version of the given content is for a second local television feed associated with the second geoID;

when the comment is not acceptable, providing an alternative comment to the second user device;

determining, in view of the second geoID, whether the given content is acceptable to provide to the second user device;

when the given content is acceptable, providing the given content to the second user device; and when the given content is not acceptable, identifying an unacceptable portion of the given content; and providing alternative content for the unacceptable portion of the given content.

* * * * *